United States Patent
Wiesbeck et al.

(10) Patent No.: US 10,843,678 B2
(45) Date of Patent: Nov. 24, 2020

(54) CONTROL SYSTEM HAVING AT LEAST ONE ELECTRONIC CONTROL UNIT FOR CONTROLLING AN INTERNAL COMBUSTION ENGINE IN A HYBRID VEHICLE

(71) Applicant: Bayerische Motoren Werke Aktiengesellschaft, Munich (DE)

(72) Inventors: Ferdinand Wiesbeck, Munich (DE); Mark Van Gelikum, Munich (DE); Nordin Smajlovic, Ottobrunn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/988,123

(22) Filed: May 24, 2018

(65) Prior Publication Data

US 2018/0265069 A1    Sep. 20, 2018

Related U.S. Application Data

(63) Continuation of application No. PCT/EP2016/078856, filed on Nov. 25, 2016.

(30) Foreign Application Priority Data

Nov. 27, 2015  (DE) ......................... 10 2015 223 588

(51) Int. Cl.
*B60W 10/06* (2006.01)
*B60W 50/00* (2006.01)
(Continued)

(52) U.S. Cl.
CPC .............. *B60W 10/06* (2013.01); *B60K 6/20* (2013.01); *B60K 6/24* (2013.01); *B60K 6/26* (2013.01);
(Continued)

(58) Field of Classification Search
CPC ...... B60W 10/06; B60W 20/12; B60W 10/08; B60W 50/0097; B60W 2720/103;
(Continued)

(56) References Cited

U.S. PATENT DOCUMENTS

2003/0006076 A1    1/2003  Tamor
2013/0297124 A1*  11/2013  Be ........................... G06F 17/00
                                                                701/22
2015/0314775 A1   11/2015  Dextreit et al.

FOREIGN PATENT DOCUMENTS

CN          101367381 A      2/2009
CN          101857022 A     10/2010
(Continued)

OTHER PUBLICATIONS

International Search Report (PCT/ISA/210) issued in PCT Application No. PCT/EP2016/078852 dated Mar. 7, 2017 with English translation (six (6) pages).
(Continued)

Primary Examiner — Joseph J Dallo
Assistant Examiner — Scott A Reinbold
(74) Attorney, Agent, or Firm — Crowell & Moring LLP

(57) ABSTRACT

In a control system having at least one electronic control unit for controlling an internal combustion engine in a hybrid vehicle, the control unit is designed in such a way that it evaluates input signals for detecting data for identifying a current situation and for identifying at least one situation forecast in the near future with regard to an expected speed curve and at least the predicted current traffic light phase duration. Depending thereon and on a change in load brought about by a driver interaction, the control unit controls, in a manner that is adaptive to the situation, the
(Continued)

restart and shutoff of the internal combustion engine independently of a currently predefined EV mode speed limit and/or EV mode load limit.

6 Claims, 9 Drawing Sheets

(51) Int. Cl.
  *B60W 10/08* (2006.01)
  *B60W 20/12* (2016.01)
  *B60K 6/20* (2007.10)
  *F02N 11/08* (2006.01)
  *B60K 6/24* (2007.10)
  *B60K 6/26* (2007.10)

(52) U.S. Cl.
  CPC ............ *B60W 10/08* (2013.01); *B60W 20/12* (2016.01); *B60W 50/0097* (2013.01); *F02N 11/0822* (2013.01); *F02N 11/0837* (2013.01); *B60K 2006/268* (2013.01); *B60W 2050/0073* (2013.01); *B60W 2510/244* (2013.01); *B60W 2520/10* (2013.01); *B60W 2540/10* (2013.01); *B60W 2555/60* (2020.02); *B60W 2720/103* (2013.01); *F02N 2200/0801* (2013.01); *F02N 2200/101* (2013.01); *F02N 2200/125* (2013.01); *F02N 2300/2006* (2013.01); *Y02T 10/6291* (2013.01)

(58) Field of Classification Search
  CPC ......... B60W 2550/22; B60W 2540/10; B60W 2520/10; B60W 2510/244; B60W 2050/0073; F02N 11/0822; F02N 11/0837; F02N 2300/2006; F02N 2200/101; F02N 2200/0801; F02N 2200/125; B60K 6/26; B60K 6/24; B60K 6/20; B60K 2006/268; Y02T 10/6291
  USPC ........................................................ 701/112
  See application file for complete search history.

(56) References Cited

FOREIGN PATENT DOCUMENTS

| CN | 103381808 A | 11/2013 | |
|---|---|---|---|
| CN | 104044574 A | 9/2014 | |
| CN | 104554233 A | 4/2015 | |
| CN | 104791381 A | 7/2015 | |
| DE | 198 31 487 C1 | 3/2000 | |
| DE | 100 35 027 A1 | 1/2002 | |
| DE | 10035027 A1 * | 1/2002 | ............... B60K 6/48 |
| DE | 101 49 905 B4 | 4/2005 | |
| DE | 10 2008 015 046 A1 | 9/2008 | |
| DE | 10 2010 062 379 A1 | 6/2010 | |
| DE | 10 2008 064 018 A1 | 7/2010 | |
| DE | 10 2011 077 656 A1 | 12/2012 | |
| DE | 102011077656 A1 * | 12/2012 | .......... F02N 11/0837 |
| DE | 10 2013 104 055 A1 | 11/2013 | |
| DE | 10 2013 016 569 A1 | 4/2015 | |
| EP | 2 781 722 A1 | 9/2014 | |
| FR | 2 863 953 A1 | 6/2005 | |
| WO | WO 2012/069580 A1 | 5/2012 | |

OTHER PUBLICATIONS

German-language Written Opinion (PCT/ISA/237) issued in PCT Application No. PCT/EP2016/078852 dated Mar. 7, 2017 (six (6) pages).
German-language Search Report issued in counterpart German Application No. 102015223588.2 dated Sep. 8, 2016 with English translation (thirteen (13) pages).
International Search Report (PCT/ISA/210) issued in PCT Application No. PCT/EP2016/078856 dated Mar. 9, 2017 with English translation (six (6) pages).
German-language Written Opinion (PCT/ISA/237) issued in PCT Application No. PCT/EP2016/078856 dated Mar. 9, 2017 (seven (7) pages).
Chinese Office Action issued in Chinese application No. 201680067133.8 dated Jul. 27, 2020, with English translation (Nineteen (19) pages).

* cited by examiner

CONTROL SYSTEM HAVING AT LEAST ONE ELECTRONIC CONTROL UNIT FOR CONTROLLING AN INTERNAL COMBUSTION ENGINE IN A HYBRID VEHICLE

CROSS REFERENCE TO RELATED APPLICATIONS

This application is a continuation of PCT International Application No. PCT/EP2016/078856, filed Nov. 25, 2016, which claims priority under 35 U.S.C. § 119 from German Patent Application No. 10 2015 223 588.2, filed Nov. 27, 2015, the entire disclosures of which are herein expressly incorporated by reference.

This application contains subject matter related to U.S. application Ser. No. 15/988,154, entitled "Control System Having at Least One Electronic Control Unit for Controlling an Internal Combustion Engine in a Hybrid Vehicle" filed on May 24, 2018.

BACKGROUND AND SUMMARY OF THE INVENTION

The invention relates to a control system having at least one electronic control unit for controlling a combustion engine in a hybrid vehicle.

For many years now, hybrid vehicles containing at least one combustion engine and at least one electric motor as drive motors have been known and have been in series production. Hybrid vehicles of this sort have control systems with at least one electronic control unit which carry out various operating procedures for selecting an operating mode appropriate for the respective current driving situation, in particular using appropriately programmed functional modules. Selectable operating modes are, in particular, purely electric driving (only the electric motor provides propulsion; "E-mode", "E-driving"), driving purely with the combustion engine (only the combustion engine provides propulsion) and/or driving with hybrid drive (both the electric motor and the combustion engine provide propulsion).

Known operating methods prioritize consideration of the charge state of the battery or of another electric store (e.g. a supercap) to select the operating mode. Parameters such as the current vehicle speed, the current driving behavior, or particular currently set customer functions are also partially taken into account here.

It is the object of the invention further to improve a control system with an operating method of the type mentioned at the beginning.

This object is fulfilled according to the invention by a control system with at least one electronic control unit for controlling a combustion engine in a hybrid vehicle, wherein the control unit is designed in such a way that it evaluates input signals for detecting data for identifying a current situation and for identifying at least one situation forecast in the near future with regard to an expected speed curve and/or power curve, and that it controls the restarting or shutting off of the combustion engine on the occurrence of a power-related driver interaction in the current situation independently of a currently specified E-travel speed limit and/or power limit when it identifies a traffic light phase and its duration as a situation forecast in the near future.

In the control system according to the invention having at least one electronic control unit for controlling a combustion engine in a hybrid vehicle, the control unit is designed in such a way that it evaluates input signals for detecting data for identifying a current situation and for identifying at least one situation prevailing in the near future with regard to an expected speed curve and a predicted traffic light phase change and, depending thereon and on a power-related driver interaction, controls, in a manner that is adaptive to the situation, the restart and shut-off of the combustion engine independently of a currently predefined E-travel speed limit and/or power limit.

In general, the invention comprises a method for controlling the restart and the shut-off of a combustion engine in a hybrid vehicle, wherein by way of an evaluation of the current situation and of forthcoming situations, preferably in a defined forecast range, in view of an expected speed curve and preferably also of a power curve depending on a driver interaction and/or on the charge state of the high-voltage store, the restart and shut-off behavior is optimized in a defined manner which will be considered further in more detail below.

According to the invention, fundamentally data is detected for identifying a current situation and for identifying at least one situation prevailing in the near future (e.g. a defined forecast horizon <5 km) and evaluated in relation to the expected speed curve. Such data for forecasting the speed curve comprise, in particular:

(i) map data about the surroundings and/or traffic guidance information from navigation systems (e.g. ADAS with RTTI) as well as (driver-specific) learning systems for the prognosis of the most probable forthcoming route, for the prognosis of speeds in forthcoming curves, for detecting forthcoming and current speed limits, for the prognosis of the forthcoming gradient curve of the route, for the prognosis of the average speed depending on the traffic density on the forthcoming route etc.,
(ii) sign recognition systems (e.g. KAFAS), in particular for identifying traffic signs with effects on the speed to be expected,
(iii) camera systems for detecting the current state of the forthcoming and relevant signal light installation (identification of the traffic light state) as well as (learning) systems in the vehicle or via a backend for the temporal prognosis of the relevant signal light installations (forecast of the traffic light state),
(iv) vehicle sensors (e.g. radar and KAFAS) for detecting other road users in front (in particular the speed and acceleration of the vehicle in front), and/or
(v) all further systems that could contribute to a prognosis of the expected speed curve.

In addition to this, preferably at least one power-related driver interaction is determined, in particular through the detection of the accelerator pedal position of the respective current wanted power.

According to the invention, the restart and shut-off of the combustion engine is controlled primarily depending on the expected speed curve in the predefined forecast horizon and on the current power-related driver interaction. In addition to this, the restart and shut-off behavior can be optimized depending on the operating state of the vehicle, such as in particular the charge state of the high high-voltage store.

The expected speed curve is preferably compared with the usual charge-state-dependent fixed or variable maximum E-travel speed limits for purely electric driving (E-mode) in a charged state (CD="charge depleting", upper E-travel speed limit) and in the discharged state (CS="charge sustaining", lower E-travel speed limit). If the actual speed falls below the currently valid E-travel speed limit, the combustion engine is immediately shut down according to the prior art. If the actual speed exceeds the currently valid E-travel speed limit, the combustion engine is immediately restarted according to the prior art. In the prior art, furthermore, a restart or shut-off is also carried out outside these speed limits if the power limits, which depend on the speed and the charge state of the battery, are exceeded or fallen below. Through the invention, the expected speed curve and power curve (or power change) are in particular considered, and not only the current speed and the current power in view of these limits which formerly were set rigidly. The new situation(s) prevailing in the near future can lead according to the invention to the (continuously variable) shift upwards and downwards and/or to ignoring these formerly situation-independent predetermined restart limits.

The control by way of the control system according to the invention, or the method according to the invention for controlling the restart or the shut-off of a combustion engine, is carried out in a defined manner, namely preferably in such a way that phases in which the combustion engine is only briefly shut-off or only briefly restarted are avoided, the E-mode is retained as long as possible when the power is comparatively low, or is avoided with a comparatively high or rising power, a restart of the combustion engine is preferably performed at the beginning of acceleration procedures, and not during acceleration procedures and not during steady travel, decelerations that are expected to be long are preferably handled with the combustion engine shut-off, and/or the number of restart and shut-off procedures while the customer is driving is reduced.

The control system according to the invention focuses on the application of a traffic light phase prediction system which is known per se (cf. e.g. the applicant's unpublished DE 10 2016 210071.8), but which can, likewise, be developed further. With a traffic light phase prediction system it is possible, for example, by means of traffic light phases whose times have been learned, or by means of a transmitting infrastructure (in particular traffic light installations) for the duration before a change of the traffic light phase to be predetermined. The system according to the invention is fitted with a receiving and evaluation unit for such infrastructure data of a usual type known per se. The electronic control unit accesses this infrastructure data.

Here, according to the invention, input signals for detecting data, for identifying a current situation and for identifying at least one situation prevailing in the near future in respect of an expected speed curve are evaluated, in particular by an appropriately designed and programmed control unit. The restart or shut-off of the combustion engine is controlled on the occurrence of a power(load)-related driver interaction (e.g. on releasing the accelerator pedal or pushing the accelerator pedal down) in the current situation, independently of a currently predetermined E-driving speed limit, if a traffic light phase change is identified or expected as a situation prevailing in the near future by a traffic light phase prediction system.

The following advantages are achieved by the invention:

1) improving the drive experience in E-mode through:
    extending the driving phase in the E-mode (by means of reducing power-dependent restart in an expected low-power situation)
    energy optimization
    restart robustness
2) improving comfort, acoustics and customer appreciation of the operating strategy through:
    avoiding brief shut-offs or restarts of the combustion engine
    reduction of shut-off fluctuations
    restart robustness (in the lower speed range)
    reduction of restarting and shut down processes in customer operation
    avoidance of restart processes during steady travel (in part by hiding in accelerations)
    favoring restarts before high-power situations (avoiding high coupling-up speed)
3) consumption reduction or range increase through:
    avoiding unnecessary E-mode driving when high power is expected
    reduction of restart losses by avoiding unnecessary shut-off processes
    increased use of recovered energy by shutting the combustion engine off promptly
4) improved sportiness or response through:
    avoiding shut-off processes that are only brief before high-power situations
    prompt restarting of the combustion engine before high power requirement Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
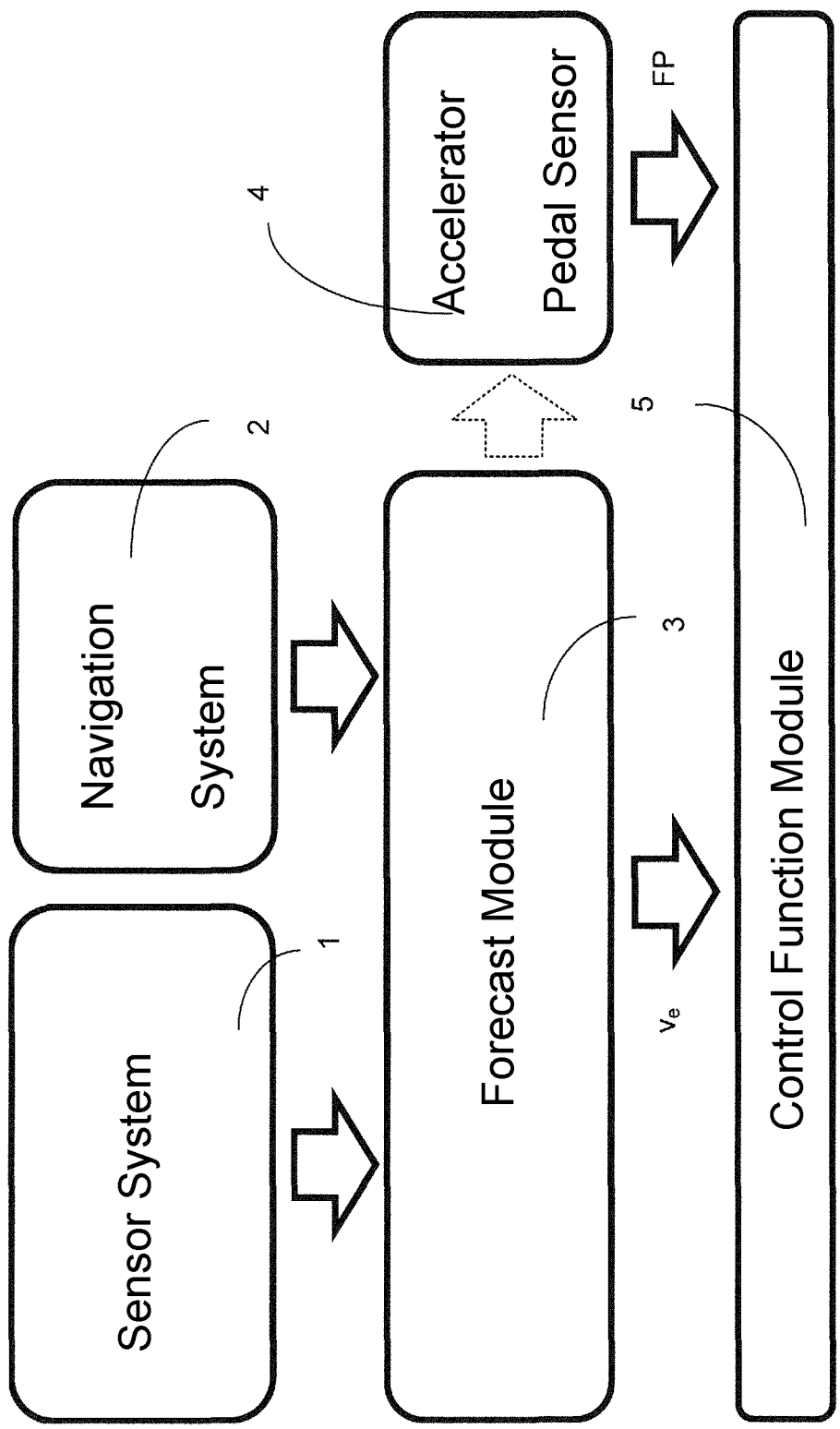
FIG. 1 is a schematic diagram of the important necessary functional components for carrying out the operating method underlying the control system.

A sensor system 1 of the vehicle itself, consisting for example of a camera and a front radar for identifying traffic signs and vehicles in front, as well as a navigation system 2 for identifying traffic guidance and predicted traffic jams, are illustrated in FIG. 1. The sensor system 1 also comprises sensors for traffic light identification and/or traffic light prognosis. Alternatively, the traffic light forecast can also be implemented or supported by a learning back-end system. A traffic light forecast can be included in the determination of the expected speed curve. The data of these two systems 1 and 2 are input signals of a forecast module 3. The forecast module 3 is designed to determine an expected speed curve $v_e$ and/or a power curve on the basis of this data, and can be a function module of an electronic control unit not illustrated here in more detail. To detect the driver interaction, an accelerator pedal sensor 4 is, for example, provided here, whose output signal FP reflects the current wanted power, or the wanted power curve, of the driver. Changes of power-reducing and power-increasing driver interactions via the accelerator pedal 4 are in particular relevant here for the invention. The output signal FP and the expected speed curve $v_e$ determined in the forecast module 3 are input signals of a control function module 5 which is also part of the control unit. A software program product is preferably contained in the control function module 5, through which the operating strategy of the control system according to the invention is realized.

The operating strategy is built on the following prior art: If the actual speed falls below the currently valid E-travel speed limit $eV_{Max}$, the combustion engine is shut off according to the prior art. If the actual speed exceeds the currently valid E-travel speed limit $eV_{Max}$, the combustion engine is immediately restarted according to the prior art. The same applies when exceeding or falling below the speed-dependent and charge-state-dependent defined restart or shut-off limits through power wishes on the part of the driver. The expected speed curve $v_e$ and/or, similarly, the expected power curve are taken into consideration by the invention in view of these limits which formerly were rigidly set. The two situations S1 and S2 lying here in the near future can, according to the invention, lead to shifting and/or to ignoring these E-travel speed limits and E-travel power limits which formerly were predetermined independently of the situation. Details relating to this operating strategy are explained with reference to the examples according to FIGS. 2 to 7:

Starting from a current situation S0, expected speed curves $v_e$ for a first situation S1 in the near future and, possibly, also for a second situation S2 in the near future, are illustrated in FIGS. 2 to 9. These three situations lie in a defined forecast horizon of, for example, about 2 km. In each figure, the operating strategy according to the prior art is shown above using the speed curves $v_e$, with the overlaid illustration of a combustion engine that is restarted or shut off. The operating strategy according to the invention is respectively shown similarly below. In each case here the speed $v_e$ with the combustion engine restarted is shown by the solid line, while the speed $v_e$ with the combustion engine shut off is shown by the dashed line.

Figure 2:
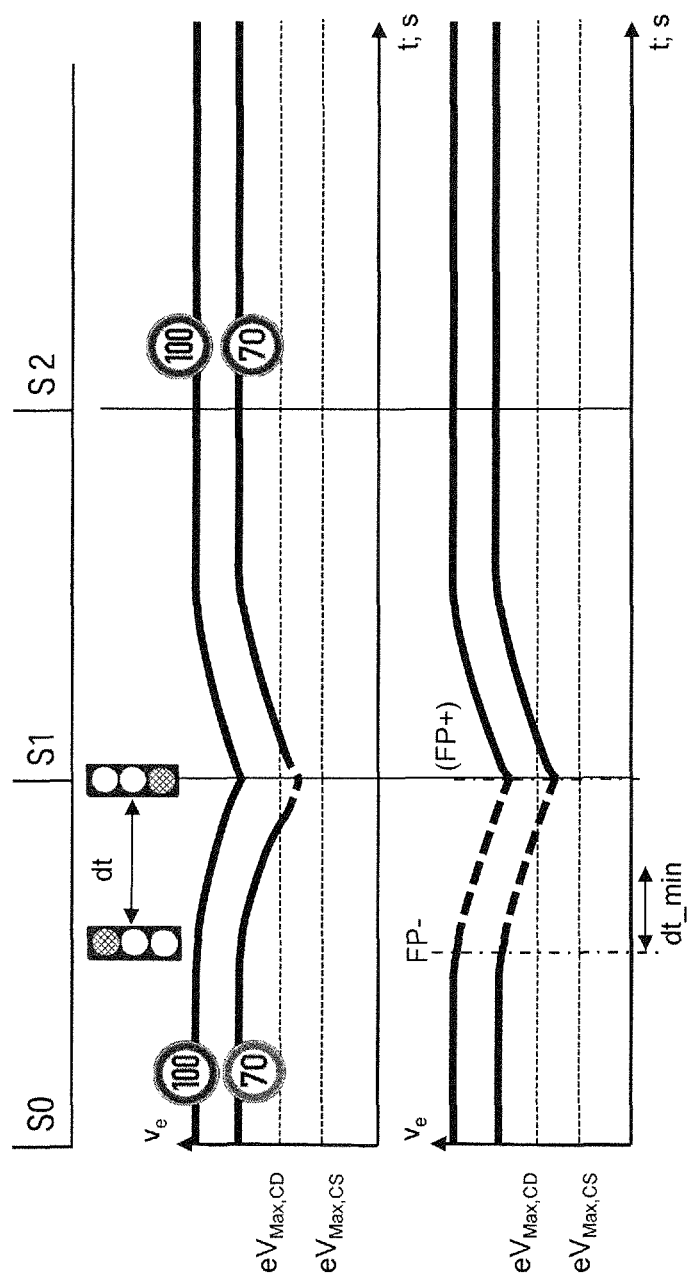
FIG. 2 graphically illustrates an Example 1: shows the current situation assuming the combustion engine is running and the traffic light phase is red; first situation in the near future: change to a green traffic light phase after a long deceleration (if the duration of the deceleration is long enough); second situation with an expected speed (e.g. speed limit) above the maximum E-travel speed.

In FIG. 2, steady travel (in each case with 100 km/h as the upper example, and in each case 70 km/h as the lower example) with the combustion engine switched on is illustrated first as the current situation S0. During the current situation S0 the driver performs a power-reducing driver interaction FP− (e.g. releasing the accelerator pedal), since, for example, he himself or, optionally, a phased traffic light assistant in the vehicle, has currently sighted a red traffic light. The at least one control unit, which can also be composed of a plurality of control units (3 and 5 in this case), also receives input signals from a traffic light prediction system, known per se, for identifying at least one situation S1 prevailing in the near future with respect to an expected speed curve $v_e$ and a forthcoming change of the traffic light phase. According to FIG. 2, a change in the traffic light phase to green, of which the control unit 3, 5 can predict the time, takes place at the transfer to the situation S1 prevailing in the near future. If the duration dt of the reduction of the expected speed curve $v_e$ following the driver interaction FP− until the entry to the first situation S1 prevailing in the near future is greater than a predetermined minimum duration dt_min, the combustion engine will be shut off straight away with the occurrence of the driver interaction FP− in the current situation S0 independently of a currently specified E-travel speed limit $eV_{Max,CD}$ or $eV_{Max,CS}$ (dashed lines).

After this, preferably, with a subsequent expected increasing speed curve $v_e$ in a future situation S1, and possibly also S2 to a value above the currently valid E-travel speed limit $eV_{Max,CD}$ or $eV_{Max,CS}$, a renewed restart of the combustion engine is made immediately with the transfer from the current situation S0 to the future situation S1 and with simultaneously renewed power-increasing driver interaction FP+.

In the example according to FIG. 2, there is in particular a reaction to a predicted, comparatively long deceleration before the power-increasing driver interaction FP+ when the traffic light is green or when entering the situation S1, in order to achieve the efficiency and the E-driver experience through taking an approximate duration of the traffic light phases into account.

Figure 3:
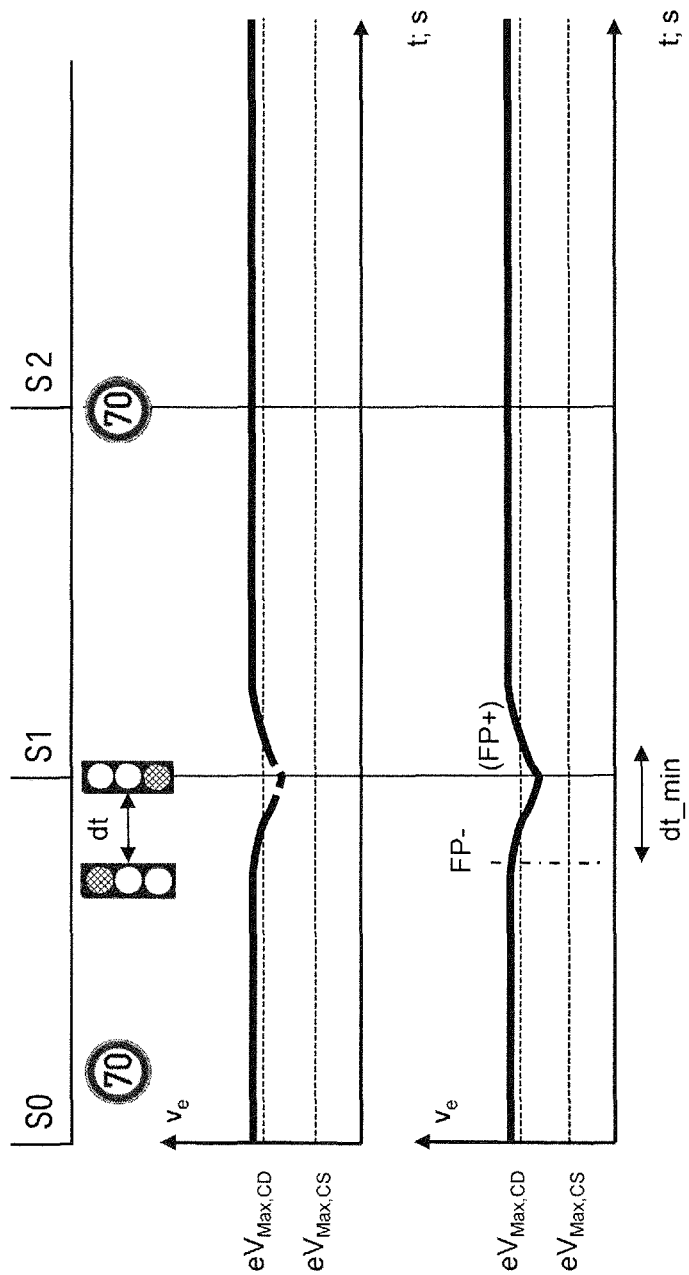
FIG. 3 graphically illustrates an Example 2: shows the current situation assuming the combustion engine is running and the traffic light phase is red; first situation in the near future: change to a green traffic light phase after a short deceleration (if the duration of the deceleration is not long enough); second situation with an expected speed above the maximum E-travel speed.

FIG. 3 shows an example similar to FIG. 2, where in this case the duration dt of the reduction of the expected speed curve $v_e$ after the driver interaction FP− until entry to the first situation S1 prevailing in the near future is smaller than a predetermined minimum duration dt_min, for example because a change in the traffic light phase to green is forthcoming in the near future. In this example, the combustion engine is not shut off, independently of the maximum E-travel speeds defined according to the prior art. The reason for this is that after the traffic light the expected speed again lies above the maximum E-travel speed, and therefore restarting the combustion engine is necessary in any case. Briefly shutting off the combustion engine is prevented if the specifications through the maximum E-travel speeds are ignored in a manner that depends on the situation and with a forecast consisting of the duration of the traffic light phases and the expected speed after the traffic light.

In the example according to FIG. 3, there is in particular a reaction to a predicted, comparatively short deceleration before the power-increasing driver interaction FP+ when the traffic light is green or on entry to the situation S1, in order to reduce the number of restarts and to avoid only briefly shutting off at the traffic light by considering an approximate, known duration of the traffic light phase and thereby the duration of the deceleration (or the target speed at the traffic light).

Figure 4:
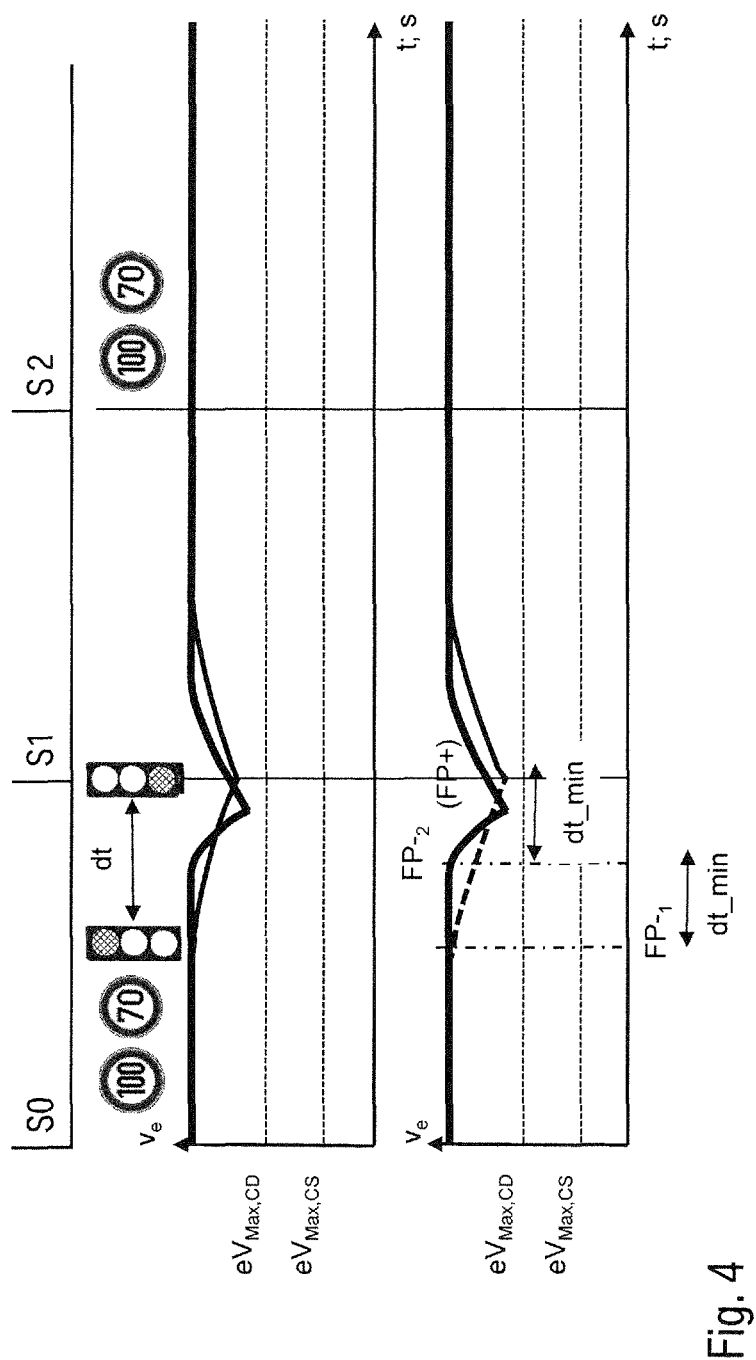
FIG. 4 graphically illustrates an Example 3: shows the current situation assuming the combustion engine is running and the traffic light phase is red; first situation in the near future: Case 1 with change to a green traffic light phase after a long deceleration (if the duration of the deceleration is long enough), e.g. because of a reaction of the driver to a phased traffic light assistant, and case 2 with change to a green traffic light phase after a short deceleration (if the duration of the deceleration is not long enough), because there is no reaction of the driver to the phased traffic light assistant; second situation with an expected speed above the maximum E-travel speed.

Two cases related to the reaction or the absence of reaction of the driver to a phased traffic light assistant that may be activated are illustrated in FIG. 4. In case 1, the power-reducing driver interaction $F_{-1}$ according to the invention leads to the combustion engine being shut off, since a change to a green traffic light phase in situation S1 still lasts sufficiently long that a deceleration starting now will exceed the minimum duration dt_min. This is because the driver reacts promptly here to a phased traffic light assistant which can disclose the green traffic light already in the current situation S0. In case 2 there is no reaction of the driver to the phased traffic light assistant, and the change of the traffic light phase to green also takes place relatively promptly. According to the invention, the power-reducing driver interaction $F_{-2}$ does not lead to the combustion engine being shut down, since a change to a green traffic light phase in situation S1 is soon imminent, and the predetermined minimum duration dt_min is thus not achievable by the power-free deceleration. With the aid of the traffic light phase prediction, it is possible to determine the deceleration time, and in particular the power-free time including the stationary time at the traffic light, and thus to decide whether shutting the combustion engine off with the removal of power by the driver is worthwhile from the efficiency point of view. The consumption caused by starting the combustion engine is here to be compared with the idling consumption throughout the power-free time (less the time in propulsion operation). The length of the power-free period in which the combustion engine can be switched off for efficiency reasons is thus critical. If this time exceeds a minimum duration, it is worth switching off the combustion engine, otherwise it should remain activated.

Figure 5:
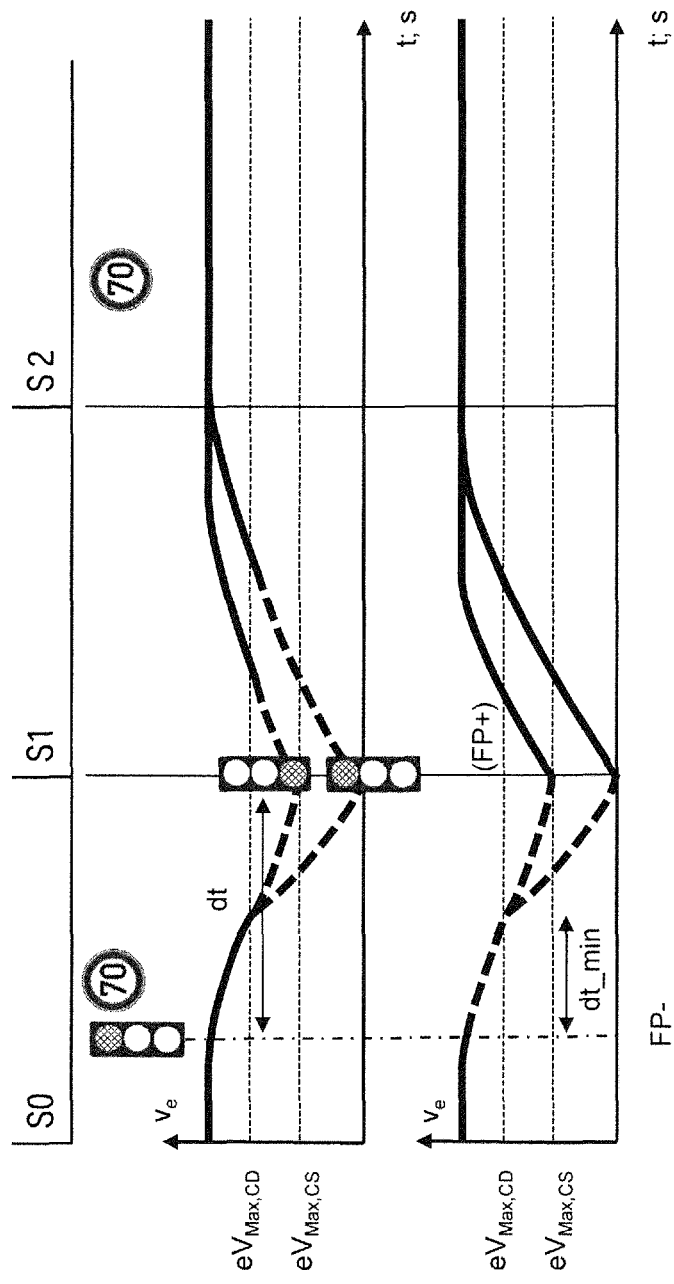
FIG. 5 graphically illustrates an Example 4: shows the current situation assuming the combustion engine is running and the traffic light phase is red; first situation in the near future: Case 1 (above) with change to a green traffic light phase and case 2 (below) with remaining in a red traffic light phase—both cases with comparatively long decelerations and accelerations with only achieving a new target speed above the maximum E-travel speed in the second situation (S2) in the near future.

A situation similar to that of FIG. 2 is illustrated in FIG. 5, wherein in case 1 (above) a change takes place to a green traffic light phase in situation S1, and in case 2 (below) the traffic light phase remains red in situation S1. Both cases comprise comparatively long decelerations and accelerations with the new target speed only reached in the second situation S2.

In the example according to FIG. 5, the efficiency and the response are increased by considering an approximate, known target speed at the traffic light or at the transition to situation S1.

Figure 6:
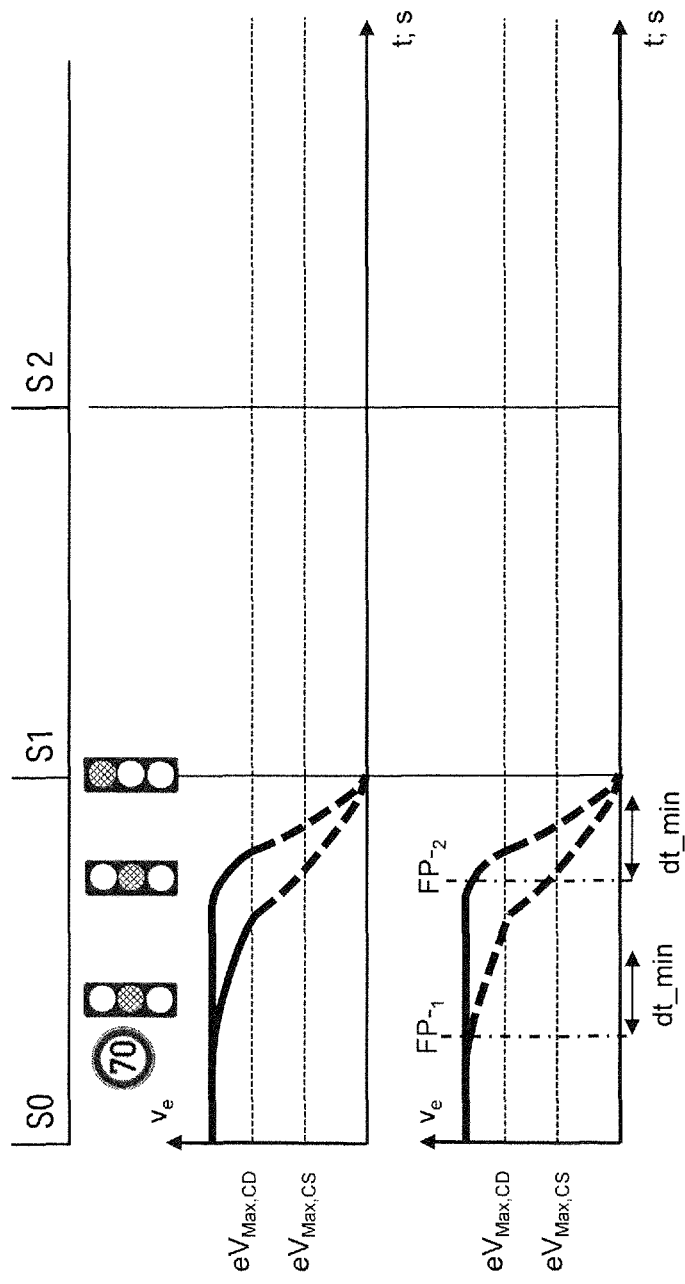
FIG. 6 graphically illustrates an Example 5: shows the current situation assuming the combustion engine is running and the traffic light phase is amber; first situation in the near future: change to red traffic light phase of sufficient duration, in which operation of the combustion engine is not necessary (total of deceleration and stationary time).

In the example according to FIG. 6, a change to a red traffic light phase takes place, or the traffic light continues to be red, at the transition to situation S1. The expected speed curve $v_e$ ends at zero at the transition to situation S1. The combustion engine is shut off at both of the power-reducing driver interactions $F_{-1}$ and $F_{-2}$, since in both cases no immediate acceleration is expected at the traffic light or at the transition to situation S1. The efficiency and the E-driving experience are improved by this early shut-off of the combustion engine as a result of the expected deceleration. The same applies to the case in which the driver follows the phased traffic light assistant and slows down early when the traffic light is green and a red phase is predicted.

Figure 7:
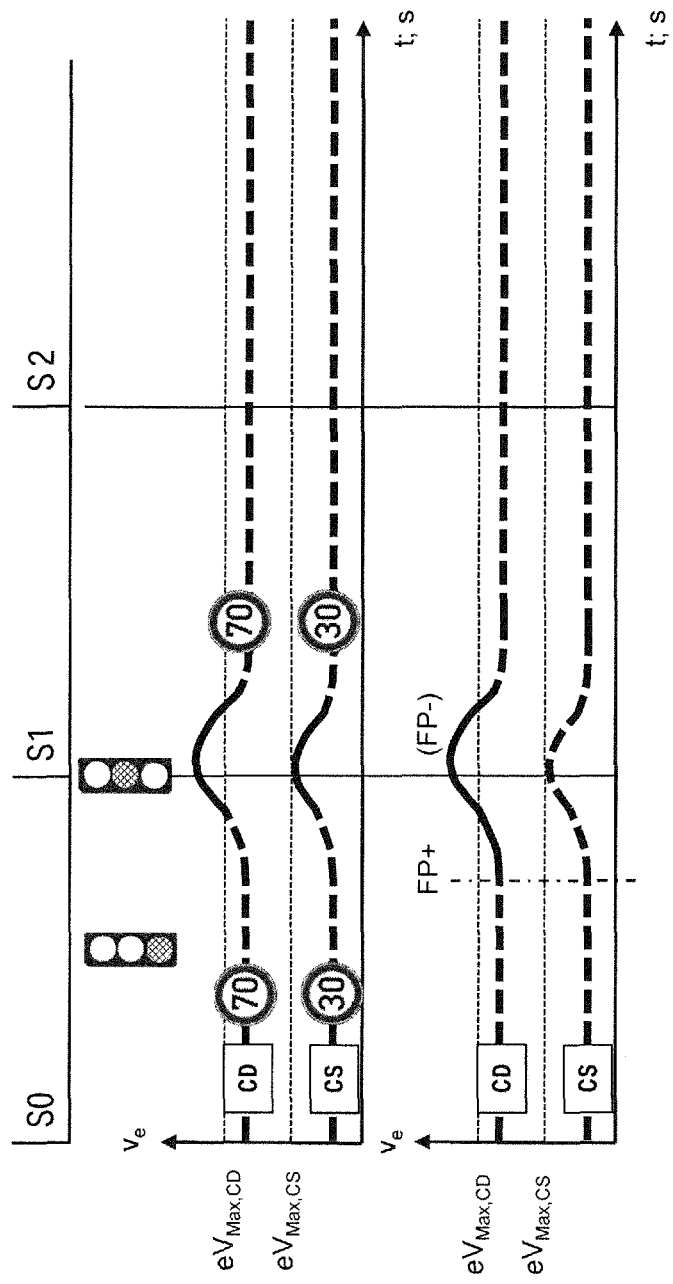
FIG. 7 graphically illustrates an Example 6: shows the current situation assuming the combustion engine is shut off and the traffic light phase is green; first situation in the near future: change to (red traffic light phase above) amber traffic light phase—leads to a short power increase.

FIG. 7 starts from an E-travel mode in the current situation S0. The combustion engine, which is switched off, is switched on without delay with the power-increasing driver interaction FP+ in the current situation S0 if a forthcoming change to a red traffic light phase is expected at the transition to the future situation S1 and, for example, at the same time a larger speed difference, including exceeding the maximum E-travel speed is necessary to pass the traffic light before reaching the red phase and/or the current speed is sufficiently far below the permitted speed limit; it is then assumed that the driver will accelerate in the amber traffic light phase, and will not stop at the red traffic light. If, on the other hand, a slight increase in speed, without exceeding the maximum E-travel speed is sufficient to pass the traffic light before reaching the red phase, the operating strategy function implements a restart robustness depending on the current power and speed. Thus, other than in the prior art, a power-dependent and ultimately unnecessary and brief restarting of the combustion engine as soon as the driver accelerates does not result.

In the example according to FIG. 7, the efficiency is increased according to the invention by considering an approximate, known target speed at the traffic light or at the transition to situation S1. In the first case (upper, out of town, CD operating mode) the combustion engine is switched on with the driver interaction FP+, since the speed curve $v_e$ to be expected significantly exceeds a specified threshold (here, for example, the upper E-travel speed limit) at the traffic light or at the transition to the situation S1, and thus the power is prioritized. In the second case (lower, built-up area, CS operating mode) the combustion engine is not switched on with the driver interaction FP+, since the speed curve $v_e$ to be expected does not exceed a specified threshold (here, for example, the lower E-travel speed limit) at the traffic light or at the transition to the situation S1, or only does so to an insignificant extent, nor is a large increase in speed expected, and thus the restart robustness is prioritized.

Figure 8:
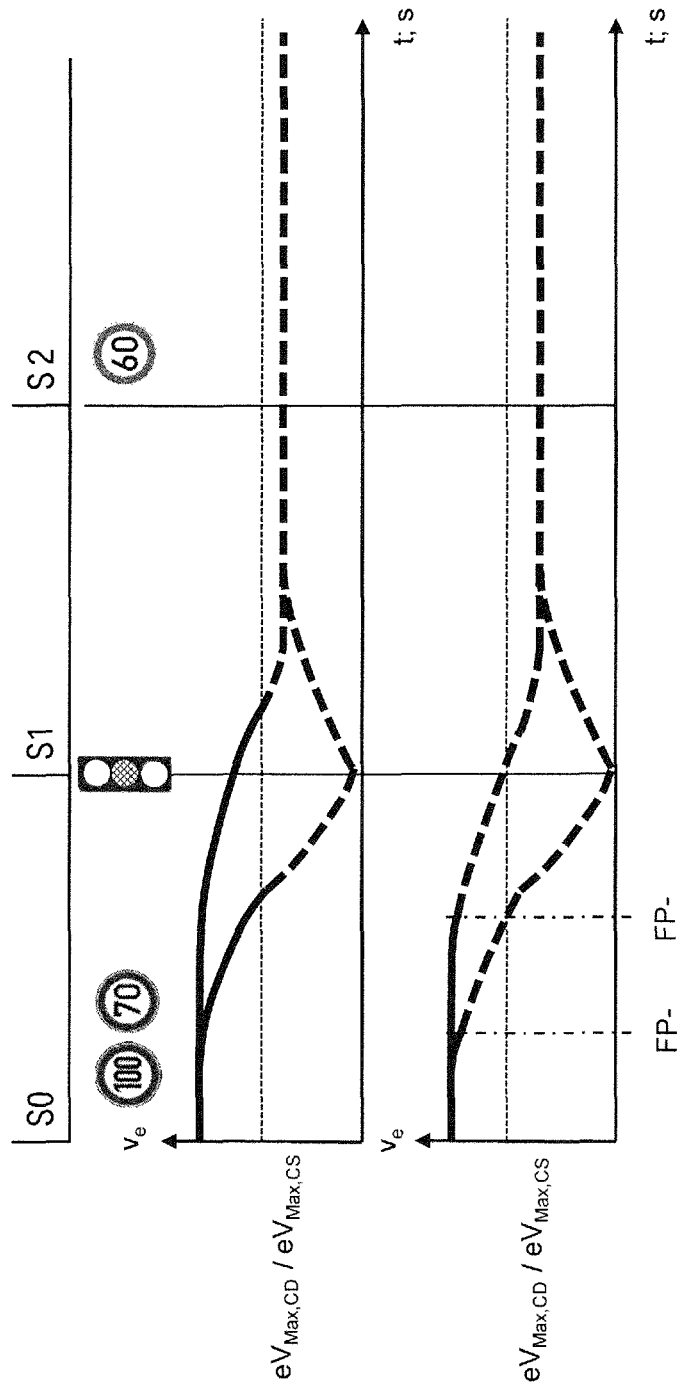
FIG. 8 graphically illustrates an Example 7: shows the current situation assuming combustion engine is running; first situation, entering into an E-travel zone with early shut-off when power is removed (F−), since after the traffic light (situation 2) is definitively known, the target speed lies below the maximum E-travel speed.

In example 7 according to FIG. 8, the current speed before the traffic light is above the maximum E-travel speed, and the predicted speed after the traffic light is below the maximum E-travel speed. In this case, the state of the traffic light is not relevant—it is only necessary to know that a traffic light is present. As soon as a deceleration is initiated by the driver, the engine should immediately be shut off in the target state. At present, this does not take place until falling below the maximum E-travel speed. The example illustrates an advantageous measure for improving the efficiency and the E-driving experience, since the full deceleration is driven electrically, and an increased potential recovery is thus also set up.

Figure 9:
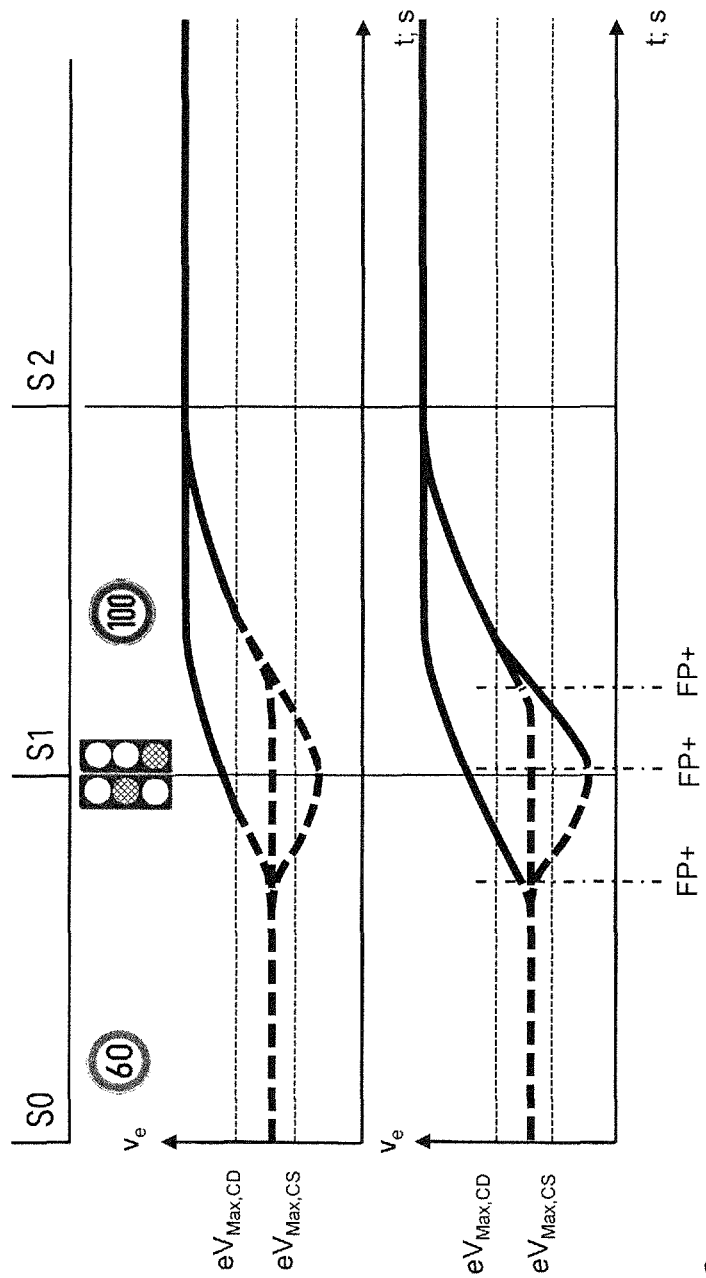
FIG. 9 graphically illustrates an Example 8: shows the current situation assuming combustion engine switched off (i.e. travel at a speed below the maximum E-travel speed); first situation is a journey out of the city after a green traffic light with early restart at increased power (F+) or start of the acceleration.

The example 8 according to FIG. 9 describes the converse case, when the current speed before the traffic light lies below and the predicted speed after the traffic light lies above the maximum E-travel speed. According to the prior art, restarting only takes place when the maximum E-travel speed or the E-driving power limit is exceeded. According to the present invention, on the other hand, the control unit already starts up the combustion engine shortly after the beginning of the acceleration, provided the traffic light changes or has changed to green. As a result of vehicles in front and at greater distances from the traffic light, the traffic light state cannot simply be directly detected by the camera, for which reason a traffic light phase prediction system is needed in order to react appropriately. This measure gives rise to the advantage that the response for the acceleration and the restart comfort are increased. In addition, electric energy of the high-voltage store is saved for later travel segments in which the purely electric travel mode is significantly more efficient than the travel mode with the combustion engine.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control system, comprising:
    an electronic control unit that controls a combustion engine in a hybrid vehicle, the electronic control unit being operatively configured to:
    evaluate input signals for detecting data for identifying a current situation and at least one future situation forecast in a near future with regard to an expected speed curve and/or power curve,
    control a restarting or shutting-off of the combustion engine based on an occurrence of a power-related driver interaction in the current situation and independently of a currently specified E-driving speed limit and/or a currently specified E-power limit, such that the currently specified E-driving speed limit and/or the currently specified E-power limit are ignored in the control of the restarting or shutting-off of the combustion engine, when the control unit identifies a traffic light phase and a duration thereof as a future situation forecast in the near future, and
    restart the combustion engine without delay at a power-increasing driver interaction in the current situation with the combustion engine shut off, if a forthcoming change to a red traffic light phase is expected at the transition to the future situation.

2. The control system according to claim 1, wherein the control unit is further operatively configured to:
    without delay in the presence of a power-reducing driver interaction in the current situation with the combustion engine switched on, and with a long delay identified by the control system because of a forthcoming change of the traffic light phase to red or of a known long pause time of the red traffic light phase at the transition to the future situation, immediately shutting-off the combustion engine at least until entry of the future situation independently of falling below an E-driving speed and/or power limit.

3. The control system according to claim 1, wherein the control unit is further operatively configured to:
    in the presence of a power-reducing driver interaction in the current situation with the combustion engine switched on, and with a forthcoming change of the traffic light phase identified by the control system at a transition to the future situation, only immediately shutting-off the combustion engine at least until entry of the future situation independently of falling below an E-driving speed limit if the duration of the reduction of the deceleration of the expected speed curve until the transition to the future situation exceeds a predetermined minimum duration.

4. The control system according to claim 1, wherein the control unit is further operatively configured to:
    with an expected increasing speed curve in a future situation to a value above the current valid E-driving speed limit, restart the combustion engine right at the beginning of the acceleration or of the power increase and/or at the transition from the current situation to the future situation.

5. The control system according to claim 1, wherein the control unit is further operatively configured to:
    specifically prevent the restarting of the combustion engine with a power-increasing driver interaction in the current situation with the combustion engine shut off and with an identified forthcoming change to a red traffic light phase at the transition to the future situation if the current or expected speed curve does not exceed a currently predetermined E-driving speed limit.

6. An electronic control unit for controlling a combustion engine in a hybrid vehicle, the electronic control unit comprising a processor and associated memory having stored therein program code that, when executed, causes the electronic control unit to:
    evaluate input signals for detecting data for identifying a current situation and at least one future situation forecast in a near future with regard to an expected speed curve and/or power curve,
    control a restarting or shutting-off of the combustion engine based on an occurrence of a power-related driver interaction in the current situation and independently of a currently specified E-driving speed limit and/or a currently specified E-power limit, such that the currently specified E-driving speed limit and/or the currently specified E-power limit are ignored in the control of the restarting or shutting-off of the combustion engine, when the control unit identifies a traffic light phase and a duration thereof as a future situation forecast in the near future, and
    restart the combustion engine without delay at a power-increasing driver interaction in the current situation with the combustion engine shut off, if a forthcoming change to a red traffic light phase is expected at the transition to the future situation.

* * * * *